US012460716B1

(12) United States Patent
Blitz et al.

(10) Patent No.: US 12,460,716 B1
(45) Date of Patent: Nov. 4, 2025

(54) FORCE LUBRICATED DIFFERENTIAL FOR ELECTRIC VEHICLE

(71) Applicant: Schaeffler Technologies AG & Co. KG, Herzogenaurach (DE)

(72) Inventors: Evan Blitz, Massillon, OH (US); David Burky, Massillon, OH (US); Scott Angel, Marshallville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/652,014

(22) Filed: May 1, 2024

(51) Int. Cl.
*F16H 57/04* (2010.01)
(52) U.S. Cl.
CPC ..... *F16H 57/0476* (2013.01); *F16H 57/0421* (2013.01); *F16H 57/0483* (2013.01)
(58) Field of Classification Search
CPC .................................................. F16H 57/0476
See application file for complete search history.

(56) References Cited

U.S. PATENT DOCUMENTS

| 8,512,193 B1 | 8/2013 | Hilker et al. | |
| 2022/0049768 A1* | 2/2022 | Nakamatsu | F16H 57/0457 |
| 2024/0288062 A1* | 8/2024 | Uehara | F16H 57/0454 |

FOREIGN PATENT DOCUMENTS

| DE | 102022100359 B4 * | 5/2024 | F16H 57/0476 |
| DE | 202024102809 U1 * | 8/2024 | B60K 11/02 |
| EP | 3530990 A1 * | 8/2019 | F16H 57/0428 |
| EP | 3892892 B1 * | 5/2023 | F16C 33/6659 |
| WO | WO-2012153589 A1 * | 11/2012 | B60B 35/18 |
| WO | WO-2015083700 A1 * | 6/2015 | B60K 1/02 |
| WO | WO-2024099653 A1 * | 5/2024 | B60K 1/00 |

OTHER PUBLICATIONS

USPTO Machine Translation (retrieved from FIT database) of the Description of EP 3892892 B1, Yu et al., May 17, 2023. (Year: 2025).*

* cited by examiner

*Primary Examiner* — Daniel D Yabut
(74) *Attorney, Agent, or Firm* — Volpe Koenig

(57) ABSTRACT

An eAxle having a housing, an electric motor supported by the housing, a differential coupled to the electric motor and supported by the housing, a source of pressurized oil, and an oil feed line coupled to the source of pressurized oil. The housing includes an inlet configured to supply oil from the oil feed line to an interior of the housing and the differential.

17 Claims, 5 Drawing Sheets

FORCE LUBRICATED DIFFERENTIAL FOR ELECTRIC VEHICLE

TECHNICAL FIELD

The present disclosure relates generally to an electric axle, and more specifically to an electric axle with a differential for an electric vehicle.

BACKGROUND

In general, electric axles (eAxles) are known structures used in electric vehicles. Electric axles typically include an electric motor and power transmission components for transmitting torque from the electric motor to the wheels of the vehicle. The power transmission components can include one or more gear stages and a differential. Differentials typically rely on passive lubrication from the differential components being partially submerged in oil. Rotation of the partially submerged differential components slings or otherwise disperses oil to other areas of the differential ensuring proper lubrication and cooling.

Due to the presence of the electric motor in the eAxle, the oil level in the e-Axle has to be carefully controlled to avoid undesirable effects. For example, the presence of oil in the air gap of the electric motor can reduce efficiency due to churning losses and may cause other issues. Accordingly, to maintain efficiency, the oil level in a conventional eAxle is typically maintained below the electric motor.

SUMMARY

Depending on the relative vertical positioning of the electric motor and the differential in an eAxle, passive lubrication of the differential may be inadequate or nonexistent. Embodiments according to this disclosure provide a force lubricated differential for an eAxle.

In accordance with one aspect, an eAxle comprises a housing, an electric motor supported by the housing, a differential coupled to the electric motor and supported by the housing, a source of pressurized oil, and an oil feed line coupled to the source of pressurized oil. The housing includes an inlet configured to supply oil from the oil feed line to an interior of the housing and the differential.

The eAxle can include an oil collector for collecting and redirecting oil supplied to the differential. The oil collector can be coaxially aligned with the differential. The oil collector can include an annular body having a u-shape cross-section opening radially inwardly. The oil collector can be fixed to the differential for rotation therewith. The oil feed line can include a hose extending at least partially external to the housing between the source of pressurized oil and the inlet. The hose can be connected at a first end to a port of an oil rail and at a second end to a differential port that is in fluid communication with the inlet. The inlet can be located above a rotational axis of the differential. A bearing can support the differential for rotation relative to the housing, and the inlet can be positioned axially between the bearing and the oil collector. The oil collector can include at least one axial hole for redistributing collected oil axially to the other portions of the differential. The source of pressurized oil can include an oil pump. A central axis of the electric motor can be located below a rotational axis of the differential. The oil feed line can be integral with the housing. The oil feed line can be made of the same material as the housing.

In accordance with another aspect, a housing for an eAxle comprises an interior capable of to at least partially contain an associated electric motor and a differential, an oil rail including an oil rail port supplying pressurized oil from a source of pressurized oil, a differential port for receiving pressurized oil, and an oil feed line fluidically coupling the oil rail port to the differential port. The housing includes an inlet fluidically coupled to the differential port configured to supply oil to an interior of the housing from the oil feed line to the differential.

The oil feed line can be integral with the housing. The oil feed line can be made of the same material as the housing.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
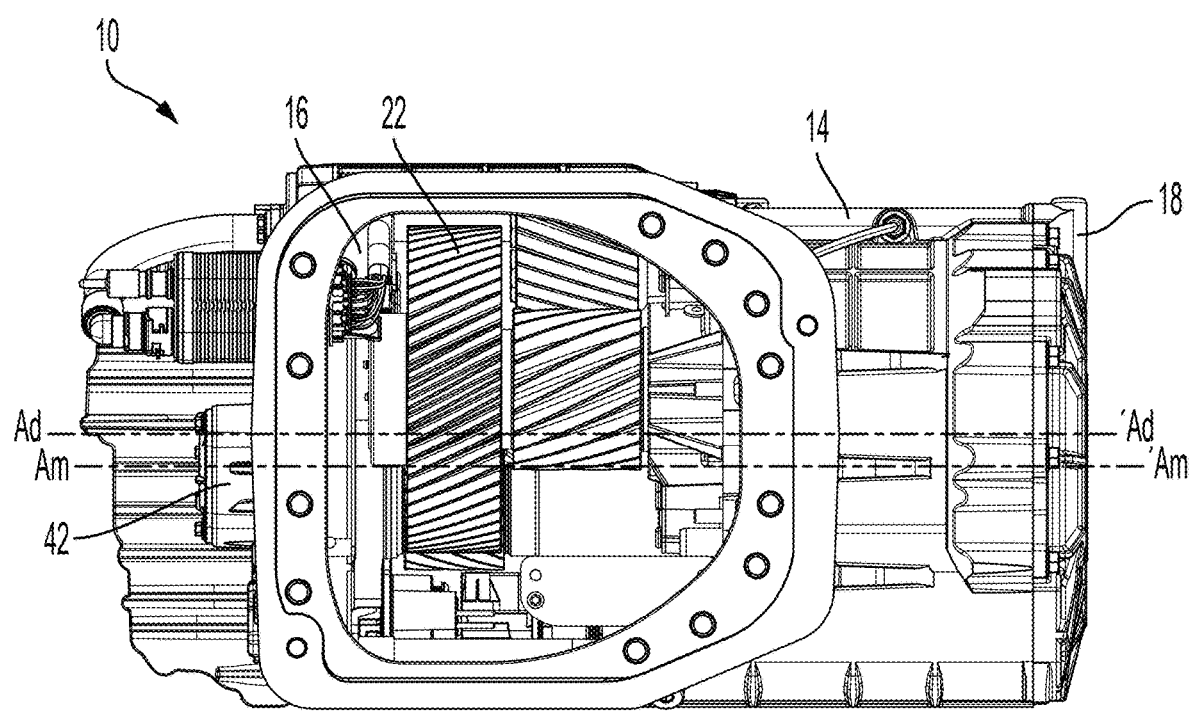
FIG. 1 is a rear elevation view of portion of an exemplary eAxle in accordance with the present disclosure.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 2:
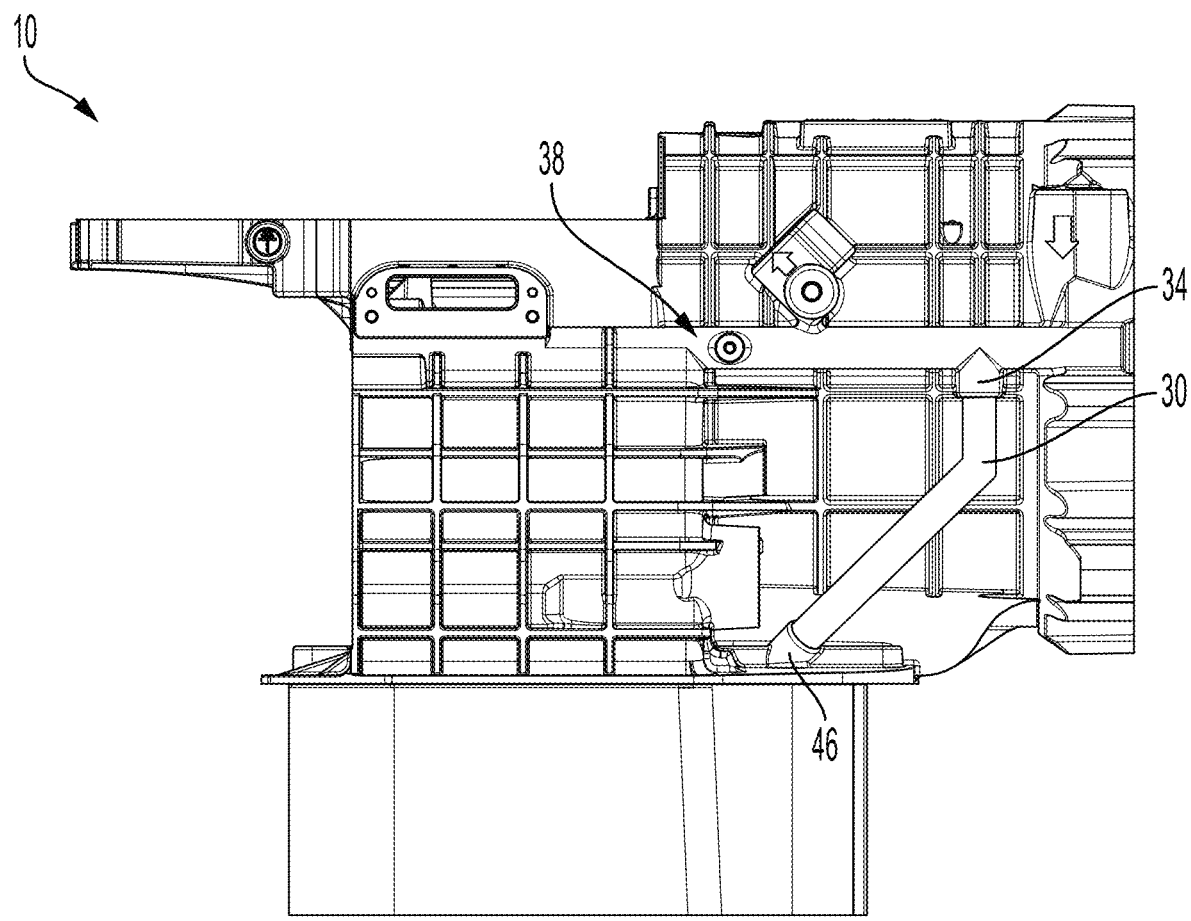
FIG. 2 is a top view of the eAxle of FIG. 1.

Referring to FIGS. 1 and 2, a portion of an exemplary eAxle is illustrated and identified generally by reference numeral 10. The eAxle 10 includes a housing 14 having an interior 16 in which an electric motor 18 is supported along with a differential 22. The rear differential cover (not shown) has been removed to expose the interior of the housing 14. As will be appreciated, torque is transmitted from the electric motor to axle half-shafts (not shown) via the differential 22.

Due to vehicle space constraints and/or installation requirements, the differential 22 is positioned within the housing 14 at a relatively high vertical position in relation to the electric motor 18. In this regard, a rotational axis Ad of the differential 22 is above a central axis Am of the electric motor 18. Accordingly, the oil level within the housing 14 should be maintained at a low level to avoid entering the air gap of the electric motor 18. Consequently, passive lubrication of the differential can be inadequate or, in some conditions, nonexistent.

As shown in FIG. 2, and in accordance with the present disclosure, an oil feed line 30 is configured to directly supply oil to the differential 22. The oil feed line 30 is coupled to a port 34 of an oil rail 38 of the housing 14. The oil rail 38 receives pressurized oil from an oil pump 42 (see FIG. 1). Oil flows from the oil rail 38 through the feed line 30 to a differential port 46 where it is directed onto the differential 22.

Figure 3:
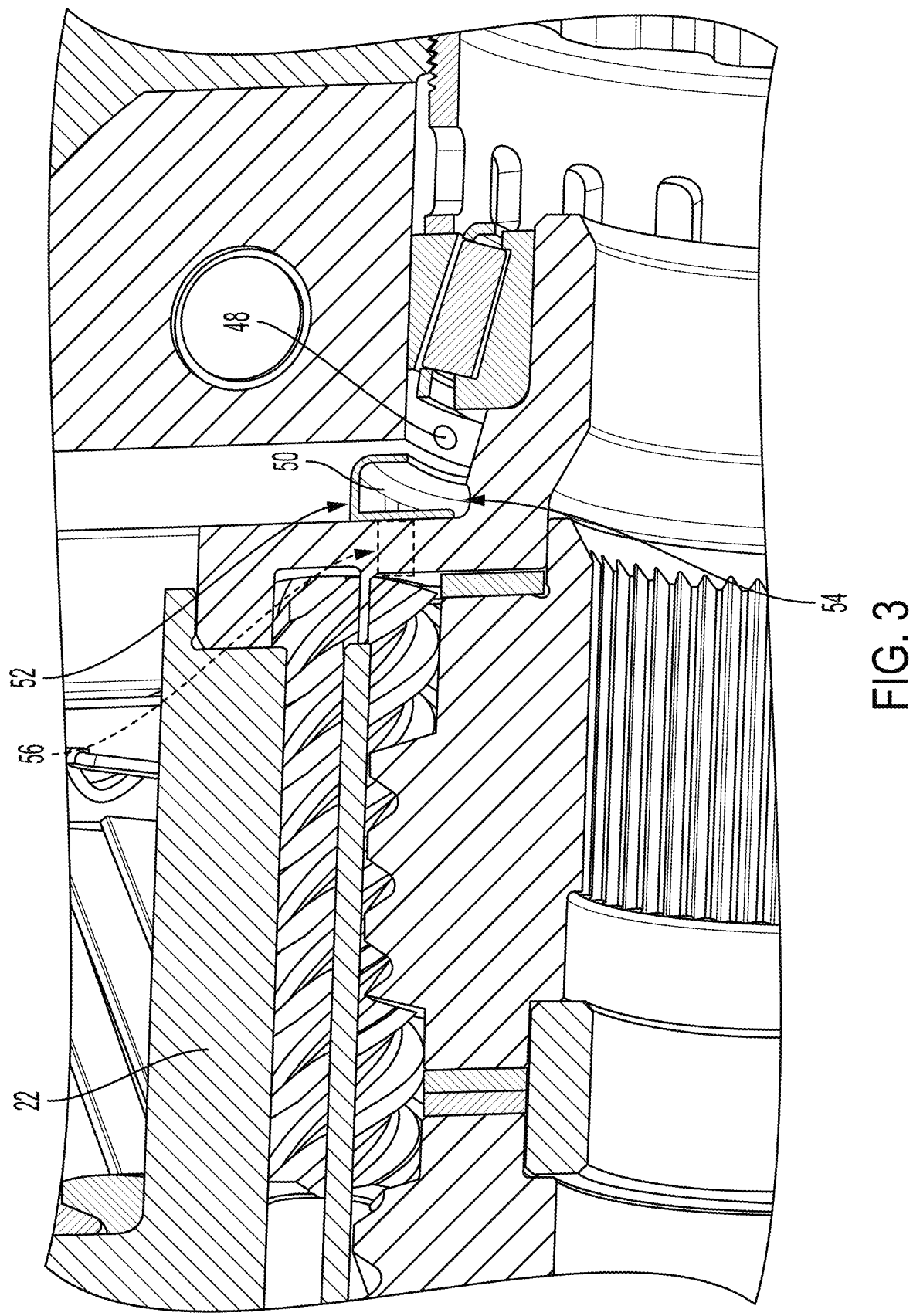
FIG. 3 is a cross-sectional view taken through a portion of FIG. 1.

In FIG. 3, an inlet 48 fluidly coupled to the differential port 46 is shown. The inlet 48 is positioned and/or otherwise configured to supply oil to the differential 22. A bearing 49 supports the differential 22 for rotation relative to the housing 14. As oil is directed onto the differential 22 via the differential port 46 and inlet 48, the rotating components of the differential 22 sling the oil radially outwardly.

An oil collector 50 is provided for collecting the oil and directing it axially onto other areas of the differential. The oil collector 50 generally includes an annular body 52 having a u-shape cross-section. The u-shape opens radially inwardly and defines a collection channel 54 for collecting oil. Axially extending holes 56 in the annular body 52 allow the oil to travel axially for distribution to other areas of the differential 22 and/or eAxle 10. The inlet 48 is located axially between the bearing 49 and the oil collector 50.

In the embodiment of FIGS. 1-3, the oil feed line 30 is an external hose or tube connected between the oil port 34 of the oil rail 38 and the differential port 46. This configuration can provide flexibility during installation as the routing of the feed line 30 can be easily customized. For example, in applications where forced lubrication is not required the ports 34 and 46 can be plugged. For applications where force lubrication is required, the oil feed line 30 can be installed between the ports 34 and 46 as shown. Depending on the specific installation, the routing of the oil feed line 30 can be customized to avoid interference with adjacent components.

Figure 4:
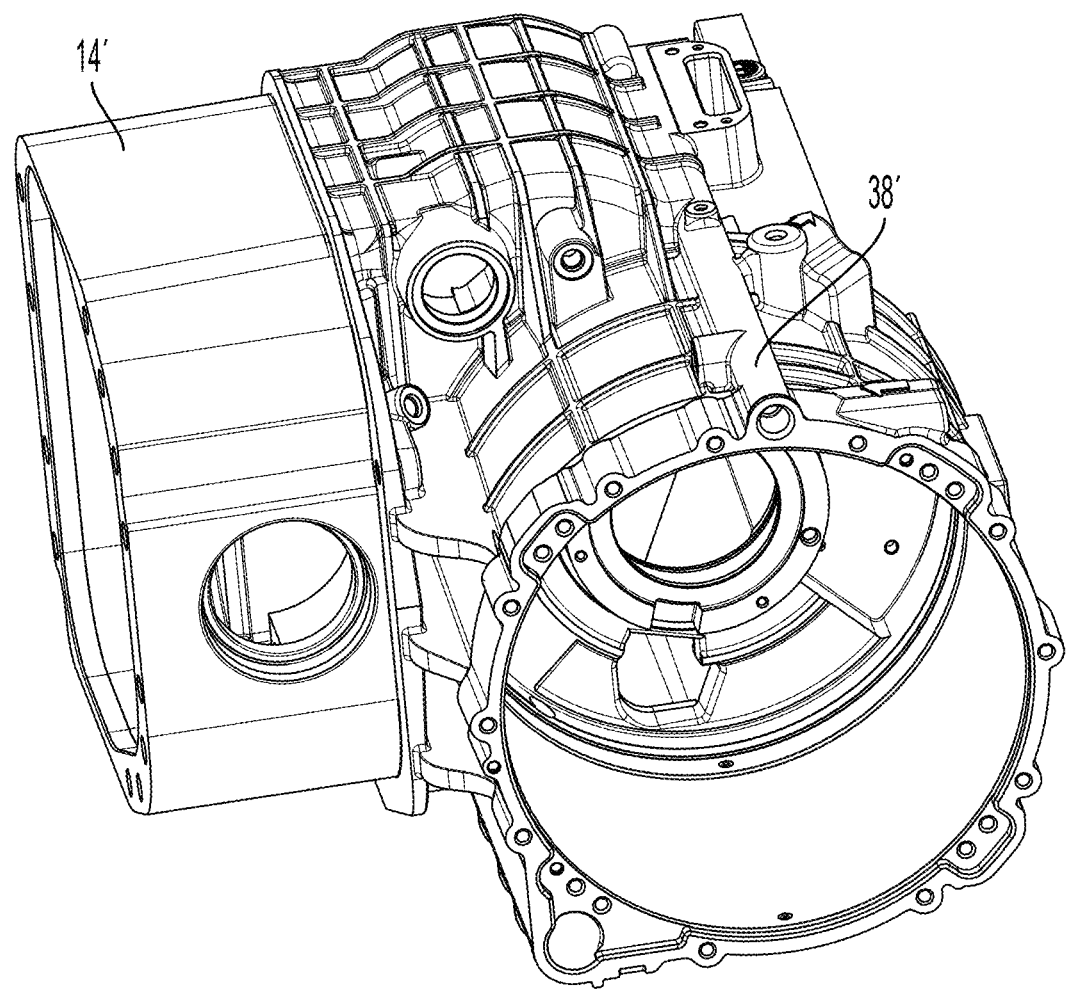
FIG. 4 is a perspective view of a housing of an eAxle in accordance with the present disclosure.
Figure 5:
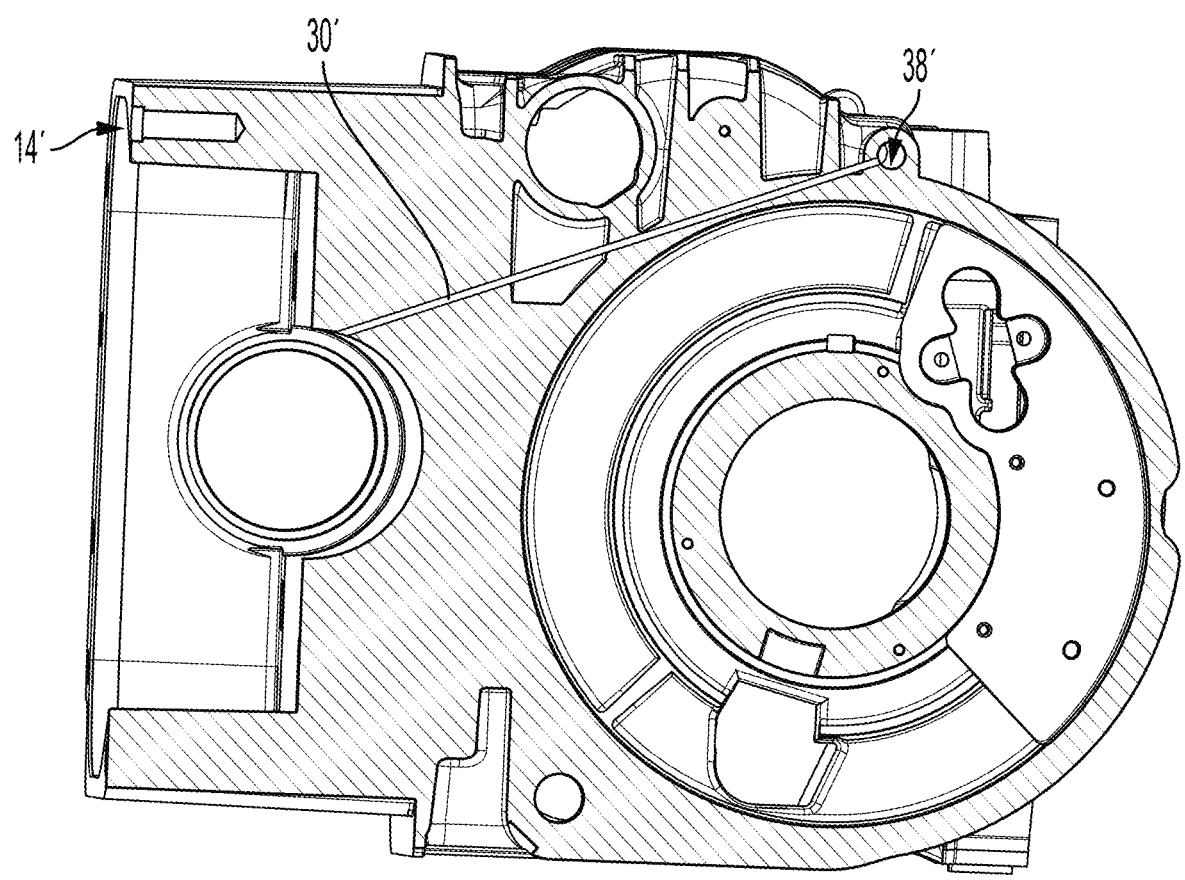
FIG. 5 is a cross-sectional view taken through an oil flow path of the housing of FIG. 4.

In FIGS. 4 and 5, another exemplary housing of an eAxle is illustrated and identified by reference numeral 14'. In this embodiment, the oil feed line 30' is integral with the housing 14' and can be formed during casting of the housing 14', or machined into the housing 14' after casting. The oil feed line 30' supplies oil from the oil rail 38' directly to the differential in the same manner as described above in connection with FIGS. 3-5. The oil feed line 30' can include one or more passageways formed in the housing 14'.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 eAxle
14, 14' housing
16 interior of housing
18 electric motor
22 differential
30, 30' oil feed line
34 port (of oil rail)
38, 38' oil rail
42 pump
46 differential port
48 inlet (to differential)
49 bearing
50 oil collector
52 annular body
54 collection channel
56 axial hole
Ad Rotational axis of differential
Am Central Axis of electric motor

What is claimed is:

1. An eAxle comprising;
   a housing;
   an electric motor supported by the housing;
   a differential coupled to the electric motor and supported by the housing;
   a source of pressurized oil; and
   an oil feed line coupled to the source of pressurized oil;
   wherein the housing includes an inlet configured to supply oil from the oil feed line to an interior of the housing and the differential; and
   wherein a central axis of the electric motor is located below a rotational axis of the differential.

2. The eAxle according to claim 1, further comprising an oil collector for collecting and redirecting oil supplied to the differential.

3. The eAxle according to claim 2, wherein the oil collector is coaxially aligned with the differential.

4. The eAxle according to claim 2, wherein the oil collector includes an annular body having a u-shape cross-section opening radially inwardly.

5. The eAxle according to claim 2, wherein the oil collector is fixed to the differential for rotation therewith.

6. The eAxle according to claim 2, further comprising a bearing supporting the differential for rotation relative to the housing, wherein the inlet is positioned axially between the bearing and the oil collector.

7. The eAxle according to claim 6, wherein the oil collector includes at least one axial hole for redistributing collected oil axially to the other portions of the differential.

8. The eAxle according to claim 1, wherein the oil feed line includes a hose extending at least partially external to the housing between the source of pressurized oil and the inlet.

9. The eAxle according to claim 8, wherein the hose is connected at a first end to a port of an oil rail and at a second end to a differential port that is in fluid communication with the inlet.

10. The eAxle according to claim 9, wherein the inlet is located above a rotational axis of the differential.

11. The eAxle according to claim 1, wherein the source of pressurized oil includes an oil pump.

12. The eAxle according to claim 1, wherein the oil feed line is integral with the housing.

13. The eAxle according to claim 12, wherein the oil feed line is made of the same material as the housing.

14. A housing for an eAxle comprising:
   an interior configured to at least partially contain an electric motor and a differential with a central axis of the electric motor located below a rotational axis of the differential;
   an oil rail including an oil rail port supplying pressurized oil from a source of pressurized oil;
   a differential port for receiving pressurized oil; and
   an oil feed line fluidically coupling the oil rail port to the differential port;
   wherein the housing includes an inlet fluidically coupled to the differential port configured to supply oil to an interior of the housing from the oil feed line to the differential.

15. The housing according to claim 14, wherein the oil feed line is integral with the housing.

16. The housing according to claim 14, wherein the oil feed line is made of the same material as the housing.

17. An eAxle comprising;
   a housing;
   an electric motor supported by the housing;
   a differential coupled to the electric motor and supported by the housing;
   a source of pressurized oil; and
   an oil feed line coupled to the source of pressurized oil; and
   an oil collector for collecting and redirecting oil supplied to the differential;
   wherein the housing includes an inlet configured to supply oil from the oil feed line to an interior of the housing and the differential; and
   wherein the oil collector includes an annular body having a u-shape cross-section opening radially inwardly.

* * * * *